US011210134B2

United States Patent
Keymolen et al.

(10) Patent No.: US 11,210,134 B2
(45) Date of Patent: Dec. 28, 2021

(54) ATOMIC EXECUTION UNIT FOR OBJECT STORAGE

(71) Applicant: Western Digital Technologies, Inc., Irvine, CA (US)

(72) Inventors: Bruno Keymolen, Ghent (BE); Wim Michel Marcel De Wispelaere, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 530 days.

(21) Appl. No.: 15/390,889

(22) Filed: Dec. 27, 2016

(65) Prior Publication Data

US 2018/0181582 A1 Jun. 28, 2018

(51) Int. Cl.
*G06F 9/48* (2006.01)
*H04L 29/08* (2006.01)
*G06F 16/23* (2019.01)
*G06F 16/176* (2019.01)

(52) U.S. Cl.
CPC ........ *G06F 9/4881* (2013.01); *G06F 16/1767* (2019.01); *G06F 16/2365* (2019.01); *H04L 67/32* (2013.01)

(58) Field of Classification Search
CPC ............. G06F 16/1767; G06F 16/2365; G06F 17/30091; G06F 17/30132; G06F 9/488; H04L 67/32
USPC ... 707/822, 955, 999.001, 999.008, 999.103, 707/999.104; 712/E9.033, E9.084
See application file for complete search history.

(56) References Cited

U.S. PATENT DOCUMENTS

| | | | |
|---|---|---|---|
| 5,940,612 A | * | 8/1999 | Brady .................. G06F 9/4881 718/103 |
| 6,442,548 B1 | | 8/2002 | Balabine et al. |
| 6,591,317 B1 | | 7/2003 | Schzukin et al. |
| 8,478,799 B2 | | 7/2013 | Beaverson et al. |
| 9,208,181 B2 | | 12/2015 | Pandev et al. |
| 9,223,800 B1 | | 12/2015 | Faibish et al. |
| 2005/0267878 A1 | * | 12/2005 | Mogi ................ G06F 16/24552 |

(Continued)

OTHER PUBLICATIONS

Anonymous, "mysqlfs/query..c at master.bainster/mysqlfs.GitHub," dated Dec. 28, 2011, pp. 5-9.

(Continued)

*Primary Examiner* — Tony Mahmoudi
*Assistant Examiner* — Kamal K Dewan
(74) *Attorney, Agent, or Firm* — Patent Law Works LLP

(57) ABSTRACT

A computer-implemented method for translating file system operations to object store operations may include necessary steps to receive a plurality of file system operations for operating files in a file system; determine corresponding objects and object store operations in an object store for the files and the file system operations; determine an order of the object store operations based on time of the file system operations received in the file system; determine dependency of the object store operations, and assign the object store operations to a first queue based on the order and dependency; determine priority of the object store operations, and transfer an entry containing an object store operation with the priority from the first queue to a second queue; and execute the object store operations in parallel and asynchronously based on organization of the object store operations in the first and second queues.

20 Claims, 12 Drawing Sheets

(56) References Cited

U.S. PATENT DOCUMENTS

| | | | |
|---|---|---|---|
| 2006/0123057 A1* | 6/2006 | Zelenka | G06F 16/128 |
| 2009/0216718 A1* | 8/2009 | Agrawal | G06F 16/2453 |
| 2010/0174731 A1* | 7/2010 | Vermeulen | H04L 67/42 |
| | | | 707/758 |
| 2012/0203986 A1* | 8/2012 | Strasser | G06F 3/0688 |
| | | | 711/158 |
| 2012/0246129 A1* | 9/2012 | Rothschild | G06F 16/13 |
| | | | 707/693 |
| 2013/0305258 A1* | 11/2013 | Durant | G06F 9/4881 |
| | | | 718/106 |
| 2014/0237159 A9* | 8/2014 | Flynn | G06F 12/0246 |
| | | | 711/102 |
| 2015/0172412 A1* | 6/2015 | Escriva | G06F 9/466 |
| | | | 709/202 |
| 2015/0199372 A1* | 7/2015 | Gavage | G06F 16/162 |
| | | | 707/741 |
| 2015/0277969 A1* | 10/2015 | Strauss | G06F 9/466 |
| | | | 707/703 |
| 2015/0309846 A1* | 10/2015 | Prasad | G06F 9/546 |
| | | | 345/522 |
| 2016/0011996 A1* | 1/2016 | Asaad | G06F 15/76 |
| | | | 710/308 |
| 2017/0031932 A1* | 2/2017 | Berrington | G06F 16/13 |
| 2017/0046264 A1* | 2/2017 | Guthrie | G06F 12/0842 |
| 2017/0060746 A1* | 3/2017 | Guthrie | G06F 12/0811 |
| 2017/0371659 A1* | 12/2017 | Smith | G06F 9/3836 |
| 2018/0159717 A1* | 6/2018 | Cormie | G06F 3/0607 |

OTHER PUBLICATIONS

Anonymous, "mysqlfs/README at master.bianster/mysqlfs. GitHub," date Jul. 13, 2009, pp. 1-2.

CMumford, "Leveldb/index.html at v1.19.google/leveldb.GitHub," dated Dec. 9, 2015, pp. 2-3.

International Search Report and Written Opinion for Internation Application No. PCT/US2017/049508, dated Mar. 20, 2018, 26 pages.

Ren et al., "TableFS: Embedding a NoSQL Database Inside the Local File System," APMRC, IEEE, Oct. 31, 2012, pp. 1-6.

Vangoor, "To FUSE or not to FUSE? Analysis and Performance Characterization of the FUSE User-Space File System Framework," dated Dec. 1, 2016, pp. 8-13.

Gehani, N., et al. "OdeFS: A File System Interface to an Object-Oriented Database" dated 1994, 18 pages, AT&T Bell Laboratories.

Satran, J., et al. "Object Store Based SAN File Systems" dated 2004, 7 pages, IBM Labs, Haifa University.

International Preliminary Report on Patentability of Application No. PCT/US2017/049508, dated Jul. 11, 2019, p. 1-17.

* cited by examiner

700

| | File System operations | | object store operations |
|---|---|---|---|
| 1 | echo '1' > 1.txt | 1 | PUT 1.txt |
| 2 | echo '3' > 3.txt | 2 | PUT 3.txt |

710

| Queue | |
|---|---|
| 1.txt | PUT 1.txt — 712 |
| 3.txt | PUT 3.txt — 714 |

Figure 7A

ATOMIC EXECUTION UNIT FOR OBJECT STORAGE

FIELD OF THE INVENTION

The present disclosure generally relates to access to an object store in data management. In particular, the present disclosure relates to executing correlated and dependent object store operations atomically and efficiently on a large number of objects. More particularly, the present disclosure relates to a file interface for efficient translation of file system operations to object store operations.

BACKGROUND

Object storage represents a data storage architecture that manages data as unrelated objects in a flat global namespace, as opposed to other storage architectures that manage data as a file hierarchy or blocks. To access data in an object store using a traditional file system, an application is required to maintain a one to one relation between files presented in a hierarchy structure in the file system and objects stored in the object storage. To keep the object store data in perfect sync with changes at the file hierarchy, current applications generally translate a series of file system operations into a corresponding order of object store operations.

However, execution of the corresponding order of object store operations in perfect sync with the changes in the file hierarchy may seriously degrade responsiveness of the file system, because the corresponding object store operations need to be executed iteratively per object. For instance, concurrent users accessing the file system would have to wait for each other, as corresponding object store operations complete, which slows down outcome of file system operations for most users. This becomes even more obvious when a file system operation affects a large number of files, which would generate a large number of corresponding object store operations. For instance, for a file system directory rename that contains 1,000,000 files, 2,000,000 object store operations (1,000,000 server side "Copy", and 1,000,000 "Delete") would be triggered, while this operation only requires a single inode update in the file system. As subsequent file system operations on these files have to wait for the object store operations to complete, this unavoidably slows down the file system performance.

For network-based object storage, sequential execution of corresponding object store operations to keep perfect sync with the changes in the file hierarchy would create additional inconvenience or slowness. For instance, for a hyper-text transfer protocol (HTTP)-based interface, every object store operation can be submitted only until a previous HTTP call returns, which would further delay execution of the corresponding object store operations.

For any of the above conditions, if the object store operations are not executed in a correct order, unpredictable and inconsistent results might occur, which could lead to unresolvable inconsistency between the file system and the corresponding object store data.

For these reasons, a file interface that improves responsiveness while maintaining consistency is needed to provide fast or immediate file system user responses for any operation while keeping the object store data in perfect sync with the changes made in the file hierarchy.

SUMMARY

The present disclosure relates to systems and methods for atomic instantaneous execution of one or more related and/or dependent object store operations. More specifically, the present disclosure relates to systems and methods for efficient translation of file system operations into object store operations. According to one innovative aspect of the subject matter in this disclosure, a system for efficient execution of a plurality of object store operations as one atomic operation includes an object storage system configured to store data as objects, the object storage system having an input and an output, the input of the object storage system coupled to receive commands for execution and data for storage in the object storage system, the output of the object storage system for providing data; and an atomic execution unit configured to execute the plurality of object store operations as the one atomic operation, the atomic execution unit having a first input, a second input, a first output and a second output, the first input and the first output coupled to the object storage system for access and storage of the objects, the second input of the atomic execution unit to receive one or more operations on the objects in the object storage system from concurrent users, the second output coupled to provide data from the object storage.

In general, another innovative aspect of the subject matter described in this disclosure may be implemented in a method that includes receiving a plurality of file system operations for operating files in a file system; determining corresponding objects in an object store for the operating files and corresponding object store operations for the plurality of the file system operations; determining an order of the object store operations based on a time when the plurality of the file system operations were received in the file system; determining dependency of the object store operations based on objects affected by the object store operations, and assigning the object store operations to a first queue based on the order and the dependency; determining priority of the object store operations based on types of object store operations, and transferring an entry with an object store operation and a priority from the first queue to a second queue; and executing the object store operations in parallel and asynchronously based on organization of the object store operations in the first and second queues.

According to another innovative aspect of the subject matter in this disclosure, a system comprises means for receiving a plurality of file system operations for operating files in a file system; means for determining corresponding objects in an object store for the operating files and corresponding object store operations for the plurality of the file system operations; means for determining an order of the object store operations based on a time when the plurality of the file system operations were received in the file system; means for determining dependency of the object store operations based on objects affected by the object store operations, and assigning the object store operations to a first queue based on the order and the dependency; means for determining priority of the object store operations based on types of object store operations, and transferring an entry with an object store operation and a priority from the first queue to a second queue; and means for executing the object store operations in parallel and asynchronously based on organization of the object store operations in the first and second queues.

Other embodiments of one or more of these aspects include corresponding systems, apparatus, and computer programs, configured to perform the actions of the methods, encoded on computer storage devices.

These embodiments are particularly advantageous in a number of respects. For instance, the technology described herein is able to improve responsiveness of file system operations towards objects in object storage without a sacrifice of consistency and accuracy. Additionally, the methods can be implemented without necessarily modifying existing file system or object manager. For example, the methods interoperate well with many existing operation systems, and thus provides a convenient means to access and manipulate objects. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIGS. 7A-7D are graphical representations of assigning object store operations based on order and dependency.

DETAILED DESCRIPTION

Systems and methods to execute a sequence of ordered and/or dependent object storage operations as a single atomic operation are described below. Specifically, the systems and methods of the present disclosure translate file system operations in a file system to object store operations in an object store with an atomic execution unit having an example file interface module and an example object operation manager, and other associated computing devices, servers, storage devices, and processing devices. While the systems and methods of the present disclosure are illustrated in the context of network-based storage system, it is to be appreciated that embodiments of the current disclosure are not restricted to use with particular illustrative system and device configurations shown in the systems. Accordingly, the atomic execution unit or its components as used herein is intended to be broadly constructed to encompass, for instance, any file interface systems comprising private and public clouding computing and storage systems, as well as other file interface systems for object storage management.

Figure 1:
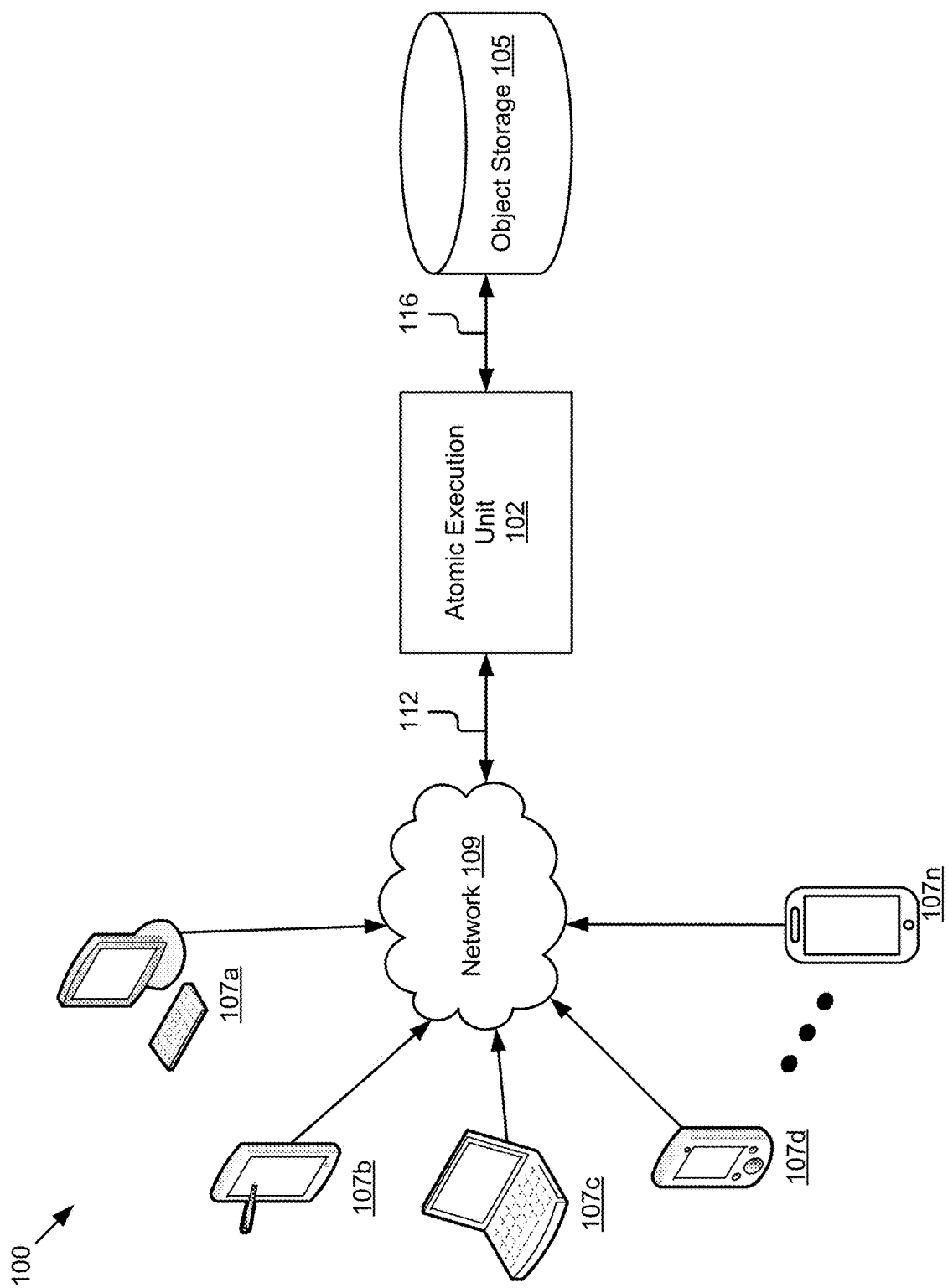
FIG. 1 is a block diagram illustrating an example object storage management system.

FIG. 1 shows a block diagram illustrating an example object storage management system 100 according to one embodiment. As illustrated, the system 100 includes an atomic execution unit 102 having a file interface module 101 and an object operation manager 103 (See also FIG. 2), an object storage 105, and a plurality of client devices 107a, 107b, 107c, 107d, . . . , 107n (also referred to herein individually and collectively as 107). In the illustrated embodiment, the plurality of client devices 107 and an atomic execution unit 102 are communicatively coupled via a network 109 to allow concurrent access to the an atomic execution unit 102 by the plurality of client devices 107.

The client devices 107 are computing devices having data processing and communication capabilities. In some embodiments, a client device 107 may include a processor (e.g., virtual, physical, etc.), a memory, a power system, a network interface, a CPU, a touch controller, a physical or wireless I/O interface controller, a display device, an input device, and/or other software and/or hardware components including, for example, wireless transceivers, keyboard, camera, sensors, firmware, operating systems, drivers, various physical connection interfaces (e.g., USB, HDMI, etc.). The client devices 107 may couple to and communicate with one another and the other entities of the system 100 via the network 109 using a wireless and/or wired connection. For instance, the client devices 107 may access the atomic execution unit 102 via the network 109 and the signal line 112, to retrieve and/or store objects in the object storage 105. Non-limiting examples of client devices 107 in the illustrated system 100 include a desktop computer, a laptop computer, a tablet computer, a mobile telephone, a personal digital assistant (PDA), or any other electronic devices capable of processing information and/or accessing the network 109.

The network 109 may be a conventional type, wired and/or wireless, and may have numerous different configurations including a star configuration, token ring configuration, or other configurations. For instance, the network 109 may include one or more local area networks (LAN), wide area networks (WAN) (e.g., the Internet), satellite networks, telephone or cable networks, cellular networks, public networks, private networks, virtual networks, peer-to-peer networks, wireless networks implemented using a wireless protocol such as WiFi® or WiMax®, and/or any other interconnected data paths across which multiple devices may communicate. Although FIG. 1 illustrates a single block for the network 109, it should be understood that the network 109 may in practice comprises any number of combinations of networks, as noted above.

The object storage 105 is a storage architecture that manages data as objects. Opposed to other storage architectures that may manage data as a file hierarchy or blocks, the object storage 105 manages data as objects. Except the data (typically a file) itself, an object may contain a variable amount of metadata and some other descriptive properties which allow better data indexing and management. For instance, an object in the object storage 105 may contain metadata that indicate a level of data protection assigned to the object, or metadata that instruct when to delete the object, when to move the object to a different geography or a different tier of storage, etc. Unlike files of the file systems in a hierarchy structure, objects are stored in the object storage 105 in a flat structure. Objects may be local or geographically separated, but they are retrieved exactly the same way due to a flat address space used for the objects. The object storage 105 may assign an object a unique identifier (ID) within a bucket, or across the entire storage 105 to support large namespaces and eliminate name collisions. An object may be retrieved by simply presenting the object ID to the object storage 105.

In some embodiments, an object in the object storage 105 may be accessed using a HTTP-based representational state transfer (REST) application programming interface (API). In some embodiments, the RESTful API of the object storage 105 may use the same HTTP verbs (e.g., GET, Post, PUT, Delete, etc.) that web browsers use to retrieve web pages and to send data to remote servers. The RESTful API may provide native access to the object storage 105 which is very efficient to on-ramp and off-ramp the object storage 105. In some embodiments, to comply with traditional file systems that may not be modified to utilize a RESTful API interface, the object storage 105 may include a mountable portable operating system interface (POSIX)-complaint file system, such as a network file system (NFS), common internet file system (CIFS), and/or Hadoop Distributed file system (HDFS), a storage area network (SAN) storage target via internet small computer system interface (iSCSI) protocol, etc. While FIG. 1 illustrates a single block for the object storage 105, the object storage 105 may in practice comprises multiple object stores with varying geographical locations.

The atomic execution unit 102 includes software, code, logic, or routines that are configured to translate file system operations in a file system to object store operations for the object storage 105. The atomic execution unit 102 is coupled for communication with the network 109 by signal line 112. The atomic execution unit 102 is coupled for communication with the object storage 105 by signal line 116. The atomic execution unit 102 further comprises an file interface module 101 and an object operation manager 103 that are described in more detail below with reference to FIG. 2.

Figure 2:
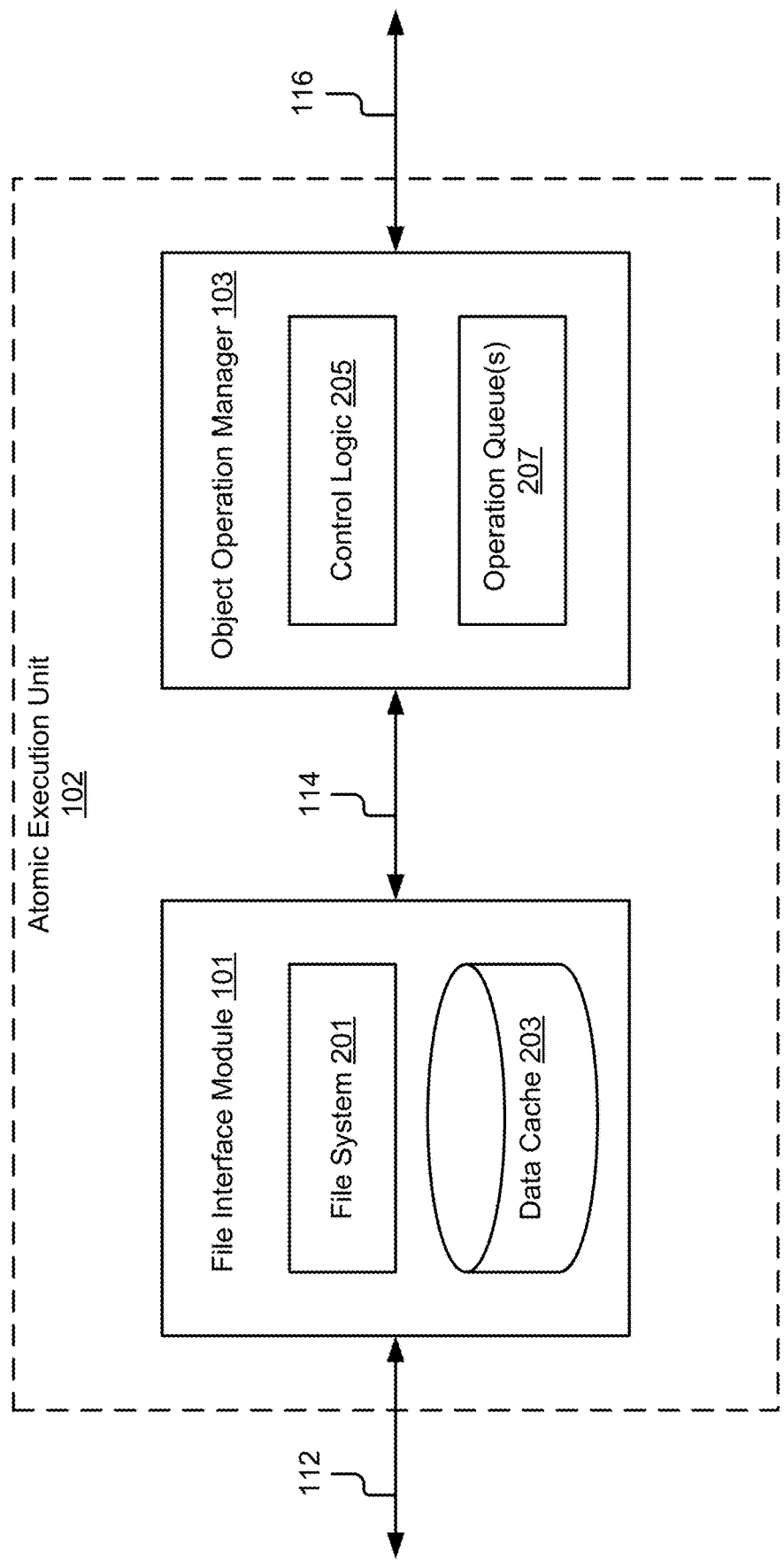
FIG. 2 is a block diagram illustrating an example atomic execution unit having a file interface module and object operation manager.

FIG. 2 illustrates an example atomic execution unit 102. As noted above, the atomic execution unit 102 may comprise the file interface module 101 and the object operation manager 103.

The file interface module 101 includes software, code, logic, or routines that are configured to receive file system operations and decouple them from perfect sync object store operations. As discussed above for the object storage 105, to comply with traditional file systems, the object storage 105 may be adapted to include a mountable POSIX-compliant tree-structured file system. This POSIX, tree structured, file system may provide a one-to-one relationship between a file in a file tree and an object in the object storage 105, and allow objects stored via RESTful API to be accessed as files and files to be accessed as objects. If the one-to-one relationship between a file in a file tree and an object in the object storage 105 is directly translated to a one-to-one sequential relationship between file system operations and corresponding object store operations, this may slow down file system feedback received in a client side due to various reasons, such as long response time for some object store operations. The file interface module 101 may prevent such perfect sync execution of object store operations by decoupling the file system operations with the object storage 105. The file interface module 101 may achieve this by first saving the received file system operations in the file interface module 101, which may be later fetched by the object operation manager 103 for further processing.

The object operation manager 103 includes software, code, logic, or routines that are configured to determine corresponding object store operations for the received file system operations, and organize these object store operations for atomic and efficient operation. The object operation manager 103 may receive the file system operations from the file interface module 101 via the signal line 114. The object operation manager 103 may then determine corresponding object store operations and further organize these object store operations. The object operation manager 103 may organize the object store operations into one or more queues, which may then be processed in parallel and asynchronously for efficient and atomic execution. The object operation manger 103 may execute the organized object store operations by communicating with the object storage 105 via the signal line 116. In some embodiments, the object operation manager 103 may additionally receive processed objects from the object storage 105 and transmit them as file data to the file interface module 101 for presenting to the client devices 107.

Referring back to the file interface module 101, it will now be described in more detail. The file interface module 101 includes software, code, logic, or routines that are configured to receive file system operations and decouple them from perfect sync object store operations. As illustrated in the FIG. 2, the file interface module 101 may include a file system 201 and a data cache 203.

The file system 201 includes software, code, logic, or routines for controlling data storage and retrieval in a storage medium. In the file system 201, files are organized in a hierarchical way so that a file can be located by describing a path to that file. Information that may describe a file and its contents (e.g. its size, its owner, who can access the file, etc.) is separately stored by the file system 201 as metadata, which is not bundled up with the file as in an object in the object storage 105. The file system 201 may work well with hundreds of thousands, and perhaps millions, of files, and is great for sharing files locally, but not geographically, if the number of files and the associated metadata are limited.

The file system 201 may be classified into different types, depending on storage media, data type, storage location, etc. In some embodiments, the file system 201 may be a disk file system, a flash file system, a tape file system, or a database file system that manages data storage in a hard disk drive, a flash memory, a magnetic tape, or a database respectively. In some embodiments, the file system 201 may be a network file system that acts as a client for a remote access protocol, providing access to files on a server. Examples of network file systems may include clients for the NFS, CIFS, Andrew file system (AFS), server message block (SMB) protocols, etc. These protocols may provide necessary capacity to allow concurrent users to access the stored data through network. For instance, the file system 201 may simultaneously receive multiple requests to get access to the object storage 105 from different client devices 107 via the network 109. The file interface module 101 may assist in decoupling the received file system requests from perfect sync object store operations by first saving the file system requests or operations in the data cache 203.

The data cache 203 is a place where data information may be temporarily stored in the file interface module 101 for immediate and/or repeat accesses. In the illustrated embodiments, the data cache 203 may store operations received by the file system 201 as temporary data. The temporarily stored files in the data cache 203 may provide immediate access to other components of the system 100. For instance, the data cache 203 may be accessed by the object operation manager 103 via the signal line 114.

In some embodiments, the stored file system operations in the data cache 203 may be automatically cleared after being fetched by other components of the system 100, for instance, by the object operation manager 103. Frequent data cache clearing may allow new cache data to be dutifully rebuilt and dynamically updated so that file system operations from the client devices 107 may be consistently processed.

In some embodiments, the data cache 203 may temporarily store other information generated by the system 100. For instance, the data cache 203 may store one or more operation queues generated by the object operation manger 103, as discussed below.

Still referring to FIG. 2, the object operation manager 103 will now be described in more detail. The object operation manager 103 determines corresponding object store operations for the file system operations and organizes the corresponding object store operations into one more operation queues for atomic and efficient object store execution. The object operation manager 103 further comprises control logic 205 and one or more operation queues 207.

The control logic 205 includes software, code, logic, routines that are configured to efficiently translate file system operations into organized object store operations for efficient execution. The control logic 205 may communicate with other components of the system 100 to achieve this functionality. The control logic 205 may first communicate with the file interface module 101 via the signal line 114, to fetch the file system operations stored in the data cache 203. In some embodiments, the control logic 205 may fetch one single file system operation at a moment, and execute corresponding object store operation(s) immediately without waiting. In some embodiments, the control logic 205 may fetch multiple file system operations concurrently form the data cache 203, which may require the control logic 205 to determine a sequential order for efficient execution of corresponding object operations.

To determine a sequential order of object actions, the control logic 205 may first determine corresponding object store operations and objects for the fetched file system operations and files. In some embodiments, the control logic 205 may rely on an object name to identify corresponding object for a file. For instance, when a client saves a file in the object storage 105, an ID may be created by the object storage 105. In some embodiments, the ID may be a hash value of the saved data or file (the hash value will change as the data or file change). However, to provide a meaningful way to remember the object, the object storage 105 may also provide the client ability to define his/her own ID, or an object name, when storing an object. The object name, or user-defined ID, may then be reflected in a file system used by the client in storing the object. Therefore, when a file is accessed in the file system 201, the corresponding object name may be indicated and thus corresponding object may be directed. For instance, for a file system operation "mv 1.txt 2.txt," the corresponding objects would be "1" and "2".

To determine corresponding object store operations, the control logic 205 may rely on the protocols used in the file interface module 101. For instance, for a RESTful API interface in the file interface module 101, a "PUT" object store operation may correspond to a data saving process in the file system 201, a "GET" operation may correspond to a reading operation in the file system, a "Delete" operation may correspond to a deleting process in the file system 201, etc.

In some embodiments, the control logic 205 may further determine dependency among multiple object store operations and operate as a dependency action manager. The control logic 205 or dependency action manager may determine dependency based on objects affected by the multiple object store operations. The control logic 205 may first determine IDs for the objects affected by an object store objection. The control logic 205 may then use a hash table to map the IDs to entries of structured operations (e.g. the operations queue(s) 207). The control logic 205 may use a hash function to compute an index into an array of entries in the operation queue(s) 207 from which the desired IDs can be found. In response to positive mapping where an ID finds an entry containing the ID, the control logic may add the operation with the related ID to the identified entry and build up a dependency tree as discussed with reference to FIGS. 3-9. The correlated object store operations with matching IDs may also be considered as dependent object store operations.

In some embodiments, the control logic 205 may use queuing mechanisms to organize the object store operations into the operation queue(s) 207 for efficient execution. To provide a fast file system feedback to client devices, the control logic 205 may use different queuing mechanisms to organize the correlated object store operations. For instance, the control logic 205 may use a general but not strict first-in first-out (FIFO) queuing mechanism or queue to organize dependent object store operations into a dependency tree structure in a general left-to-right order. For example, the control logic 205 may also use a priority queuing mechanism to organize independent object store operations (i.e., those object store operations without matching IDs) or dependency trees into one or more queues. The priority queuing mechanism may determine a priority level for each object store operation, and assign the independent object store operations and dependency trees into different queues with different levels of priority. For instance, the control logic 205 may determine two levels of priority existing in object store operations. A "GET" operation may be considered as an object store operation with a high priority, while all other object store operations may be considered to have a low priority. In some embodiments, there might be more than two levels of priority, depending on developments of object storage technologies and/or categorizing of object store operations. For instance, there might be three levels, four levels, or five or more levels of priority for object store operation organization. The control logic 205, may accordingly generate three, four, or five or more queues for these object store operations with different levels of priority.

In some embodiments, the control logic 205 may execute object store operations according to organized structure in the operations queue(s) 207. For instance, according to the priority queuing mechanism, the control logic 205 may first empty entries in a queue with a higher priority before processing a queue with a lower priority. In processing a specific queue, the control logic 205 may process entries in the queue in parallel, since each entry has no dependency with one other, and parallel execution of these entries will not cause inconsistency and inaccuracy among the affected objects. This parallel execution may greatly improve overall processing speed of all object store operations and thus provide fast feedback in response to user file system operations. In processing an entry with dependent object store operations, the control logic 205 may process these operations according to the FIFO queuing mechanism with some exceptions, as discussed further in detail with reference to FIG. 9.

In some embodiments, the control logic 205 may perform other general object storage management functions. For instance, the control logic 205 may retrieve objects from the object storage 105 and transmit the objects as file data to the file system 201 for presenting to the client devices 107.

The operation queue(s) 207 include one or more queues that organize the object store operations for correlated the file system operations. In some embodiments, the operation queue(s) 207 may include a background queue without a priority. The background queue may include one or more entries with each entry containing either an independent object store operation or a dependency tree containing multiple dependent object store operations. Additionally and/or alternatively, the operation queue(s) 207 may include one or more priority queues. In some embodiments, one or more priority queues may be stored with the background queue in the data cache 203 in the file interface module 101, or in another data cache (not shown) in the object operation manager 103, for temporality storage. In some embodiments, a priority queue may not be stored in the data cache in the file interface module 101 or the object operation manager 103. Once generated, a priority queue may be immediately accessed by the control logic 205 for object store operation execution. Once the priority queue(s) is emptied, the control logic 205 may fetch the background queue from the data cache in the file interface module 101 or the object operation manager 103 for execution.

Figure 3:
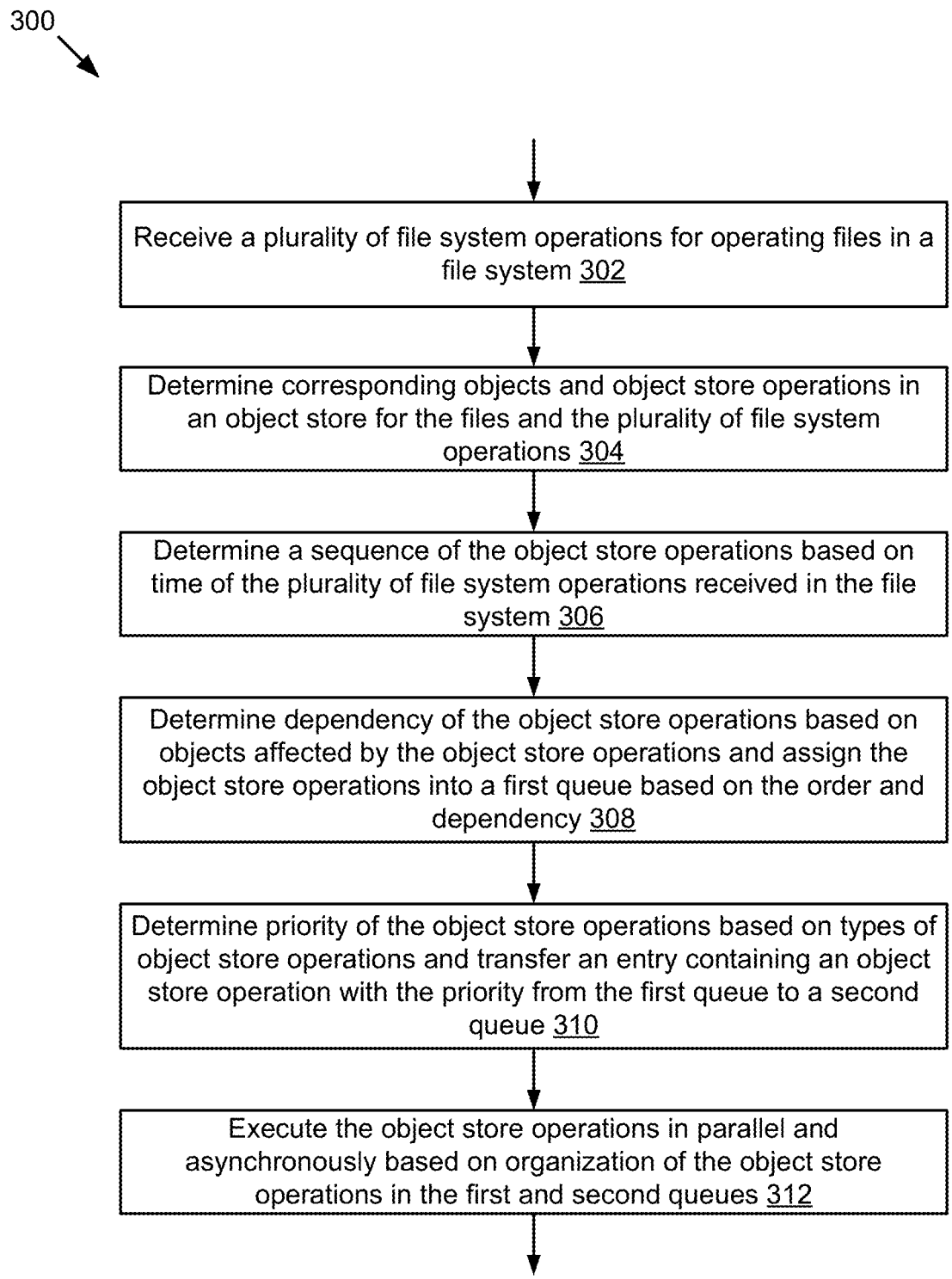
FIG. 3 is a flow chart of an example general method for translating file system operations to object store operations.

An operation of the object operation manager 103 will now be described in more details with reference to the method 300 in FIG. 3. The operation as illustrated includes steps 300 through 312, which are generally suitable for the file system related applications. However, it should be noted that the illustrated method may also be used for any other system that provides an interface for accessing an object storage system.

At block 302, the method 300 may receive a plurality of file system operations for operating files in a file system. The plurality of file system operations may be received locally or in a different geography. For instance, the file system operations may be received from the client devices 107 through one or more networks 109. The file system operations may be received from multiple client devices 107, and each file system operation may include one or more files to be operated. For instance, the following list is an example of file system operations that the file system 210 may receive sequentially at a short period of time:

1. echo '1'>1.txt
2. echo '3'>3.txt
3. mv 1.txt. 2.txt
4. mv 2.txt 3.txt
5. echo '2'>2.txt
6. echo '4'>4.txt.

At block 304, the method 300 may determine corresponding objects in an object store for the files and corresponding object store operations for the plurality of file system operations. An object may include a file and the metadata related to the file. In some embodiments, the method 300 may look for the metadata in the object to map the file to the corresponding object. The metadata may include an object name defined by a client while storing the object. For instance, for the above file system operation "echo '1'>1.txt," the file name "1" may be correlated to the object name "1". The method 300 may rely on the object name "1" to determine corresponding object "1", and even later to retrieve the exact object in the object storage 105 for execution.

The method 300 may further determine corresponding object store operations for the file system operations. The method 300 may determine the corresponding object store operations based on protocols used in the file interface module 101. For instance, for the above list of the file system objections, the method 300 may determine the corresponding object store operations as shown in FIGS. 7A-D. In the figures, the left columns 702, 722, 752, and 772 of Tables 700, 720, 750, and 770 represent the file system operations, while the right columns 704, 724, 754, and 774 of the same tables represent the corresponding object store operations. It should be noted that there may be more than one corresponding object store operations for a single file system operation. For instance, for the file system operation "mv 1.txt. 2.txt," there are two corresponding object store operations, "Copy 1.txt 2.txt" and "Delete 1.txt," as shown in Table 720 of FIG. 7B.

At block 306, the method 300 may determine an order of the corresponding object store operations based on time of the plurality of file system operations received in the file system. For each received file system operation, it may contain a timestamp which indicates when it is received in the file system 201. The timestamp may contain a time in seconds (since 1970-01-01 T00:00:00Z). An order for the file system operations may then be built based on timestamps for these operations. Based on the correlation between the file system operations and the corresponding object store operations, an order of object store operations may be also determined, and an ordered list of object store operations may then be generated. In occasions where two or more object store operations correspond to a single file system operation, these two or more object store operations may be placed in the same position of the order for the corresponding object store operations, or they can be placed consecutively based on a logic order between the two or more object store operations. For instance, for the two object store operations "Copy 1.txt 2.txt" and "Delete 1.txt" corresponding to the single file system operation "mv 1.txt. 2.txt," the "Copy 1.txt 2.txt" operation may be placed ahead of the "Delete 1.txt" operation in the ordered list due to a logic order between these two operations. The "Copy 1.txt 2.txt" operation should logically be processed before the "Delete 1.txt" operation.

At block 308, the method 300 may determine dependency of the object store operations based on objects affected by the corresponding object store operations and assign the object store operations into a first queue based on the order and the dependency of these object store operations. In some embodiments, the method 300 may first assign the corresponding object store operations into a first queue based on the order and dependency. To assign the corresponding object store operations based on order, and also to ensure a proper FIFO mechanism to be applied, the method 300 may always start the assignment process with the object store operation ranked in the first position of the ordered list of unassigned corresponding object store operations (hereinafter referred to as "the first-ranked object store operation"). The method 300 may then determine the dependency of the first-ranked object store operation and assign it according to the procedure discussed with reference to FIG. 4.

Figure 4:
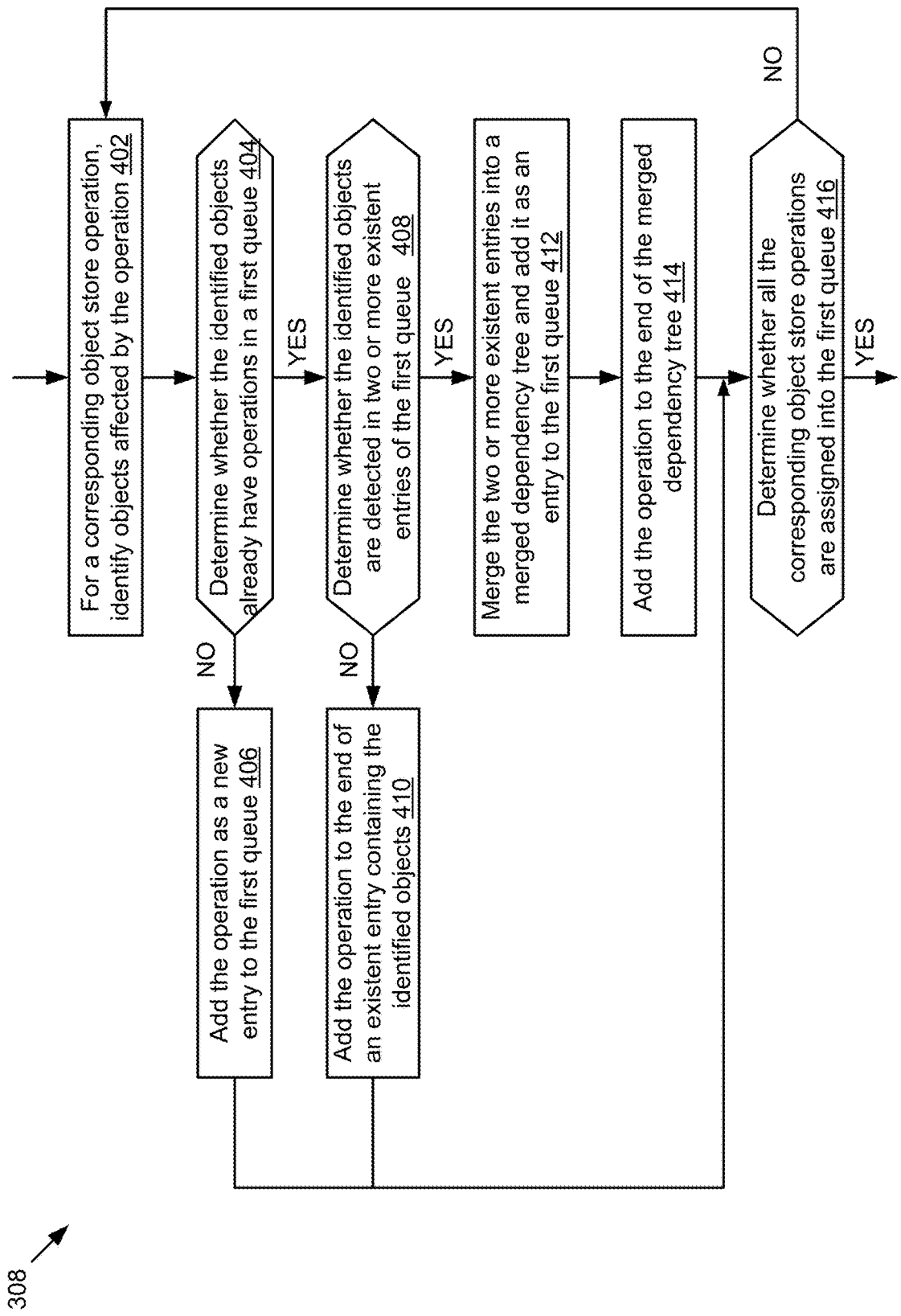
FIG. 4 is a flow chart of an example method for assigning object store operations based on dependency.

Referring now to FIG. 4 for dependency-based assignment, the method 308 may start by identifying objects affected by the first-ranked object store operation at block 402. This may be achieved by examining IDs, or object names, associated with the operation. An object store operation may include one or more objects, depending on each specific operation. For instance, a "PUT 1.txt" operation includes only one object "1", while a "Copy 1.txt 2.txt" operation includes two objects "1" and "2."

At block 404, the method 308 may determine whether the identified objects already have operations in a first queue (i.e., the default queue or the background queue for receiving operations during the assignment). The method 308 may make use of a hash table or any other type of suitable correlation mechanism to match ID of an identified object to IDs of objects already having operations in the first queue.

At block 406, if the IDs of the identified objects for an object store operation are not found in any existent entry of the first queue, the object store operation may then be added as an independent object store operation to the first queue as a new entry. Table 710 in FIG. 7A provides an example illustrating this situation. For an object store operation 712 "PUT 1.txt", there is no existent operation for the object "1", so the "PUT 1.txt" operation 712 is added as a new entry to the queue 716. Similarly, a single "PUT 3.txt" operation 714 is also added as a new entry to the queue 716, as there is no existent operation for the object "3".

However, for some operations, IDs of the identified objects may be detected in existent entries of the first queue during the assignment. At block 408, the method 308 may then determine whether the IDs are detected in two or more existent entries.

Figure 7B:
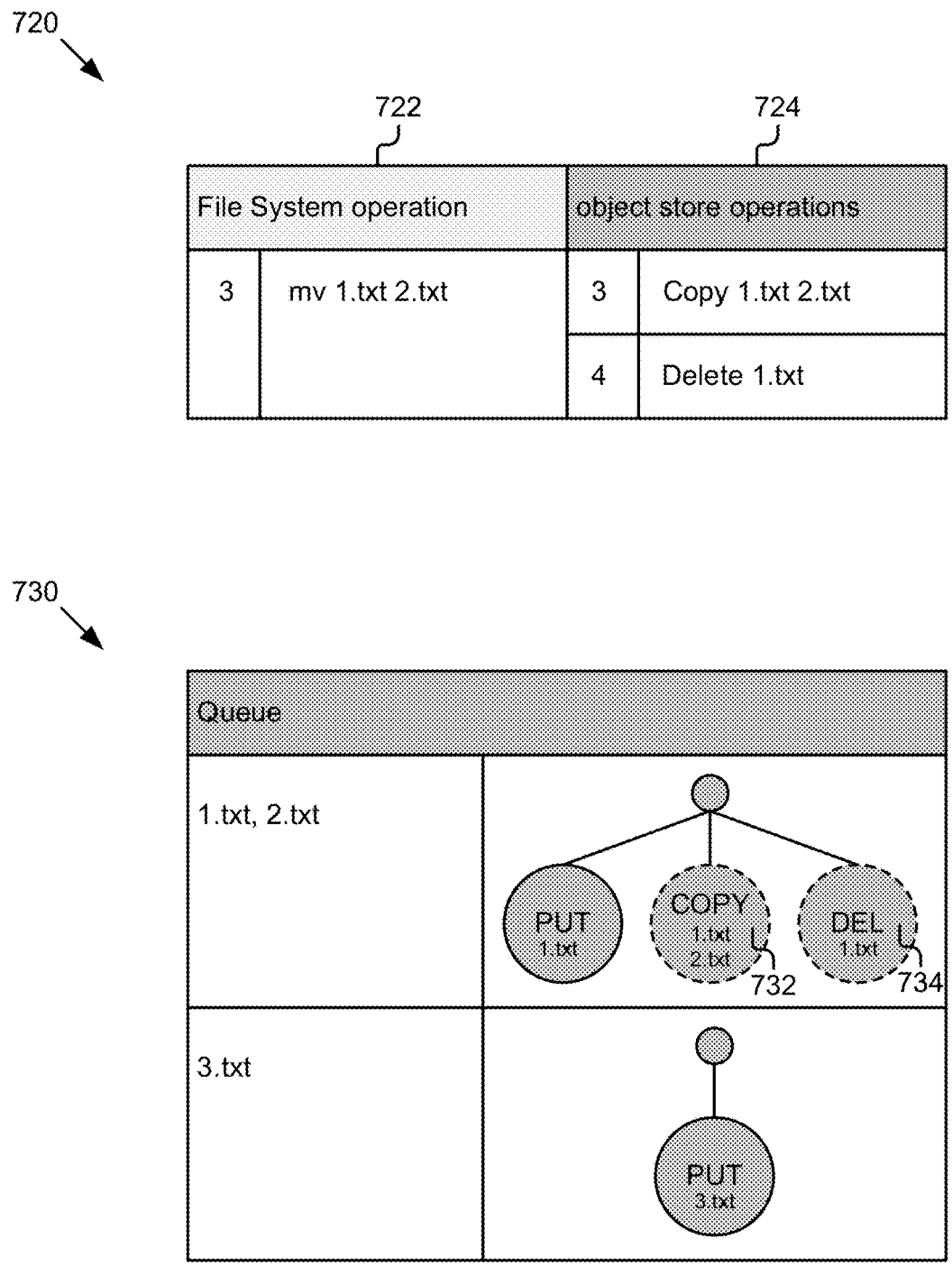
Figure 7C:
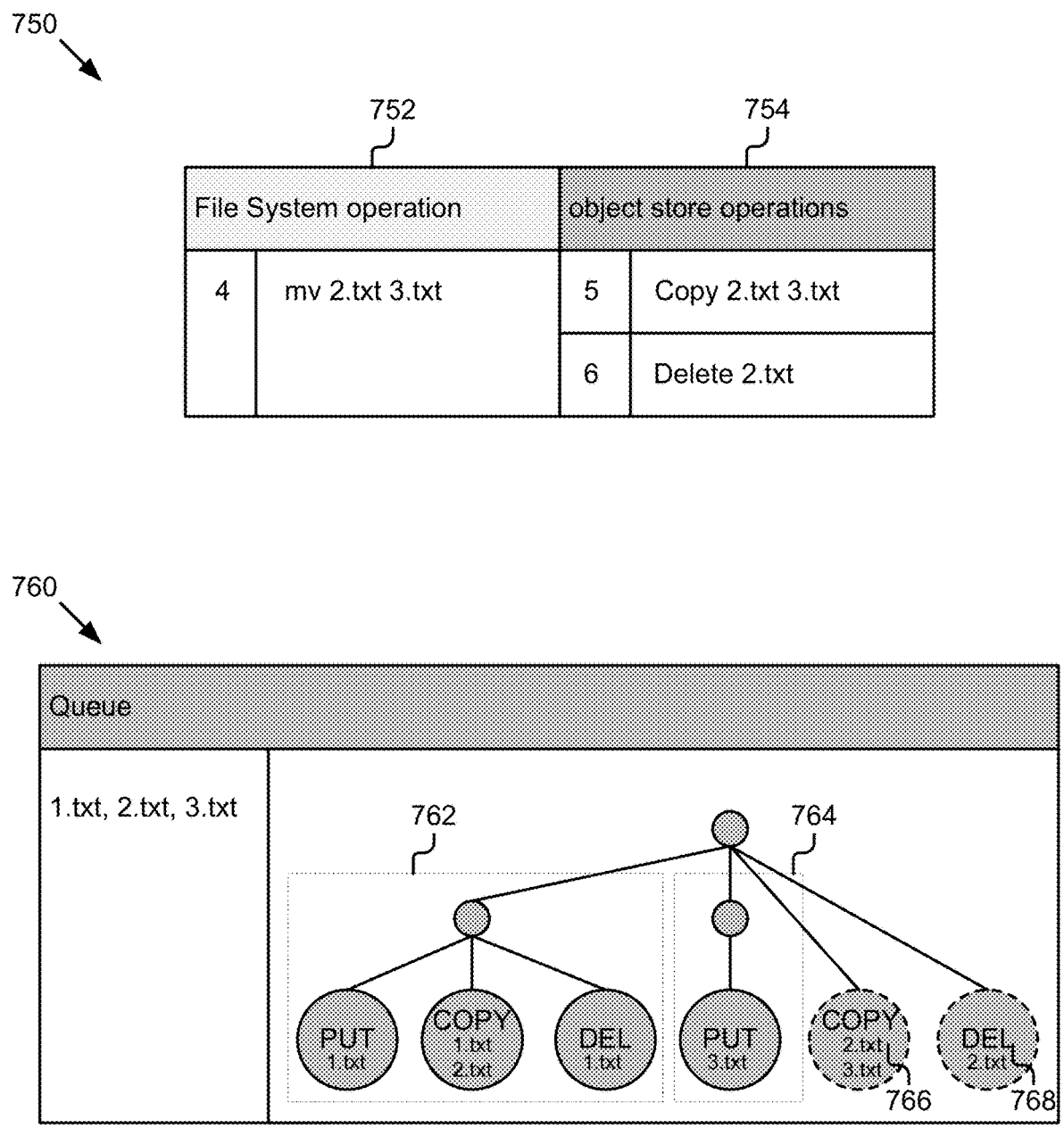
Figure 7D:
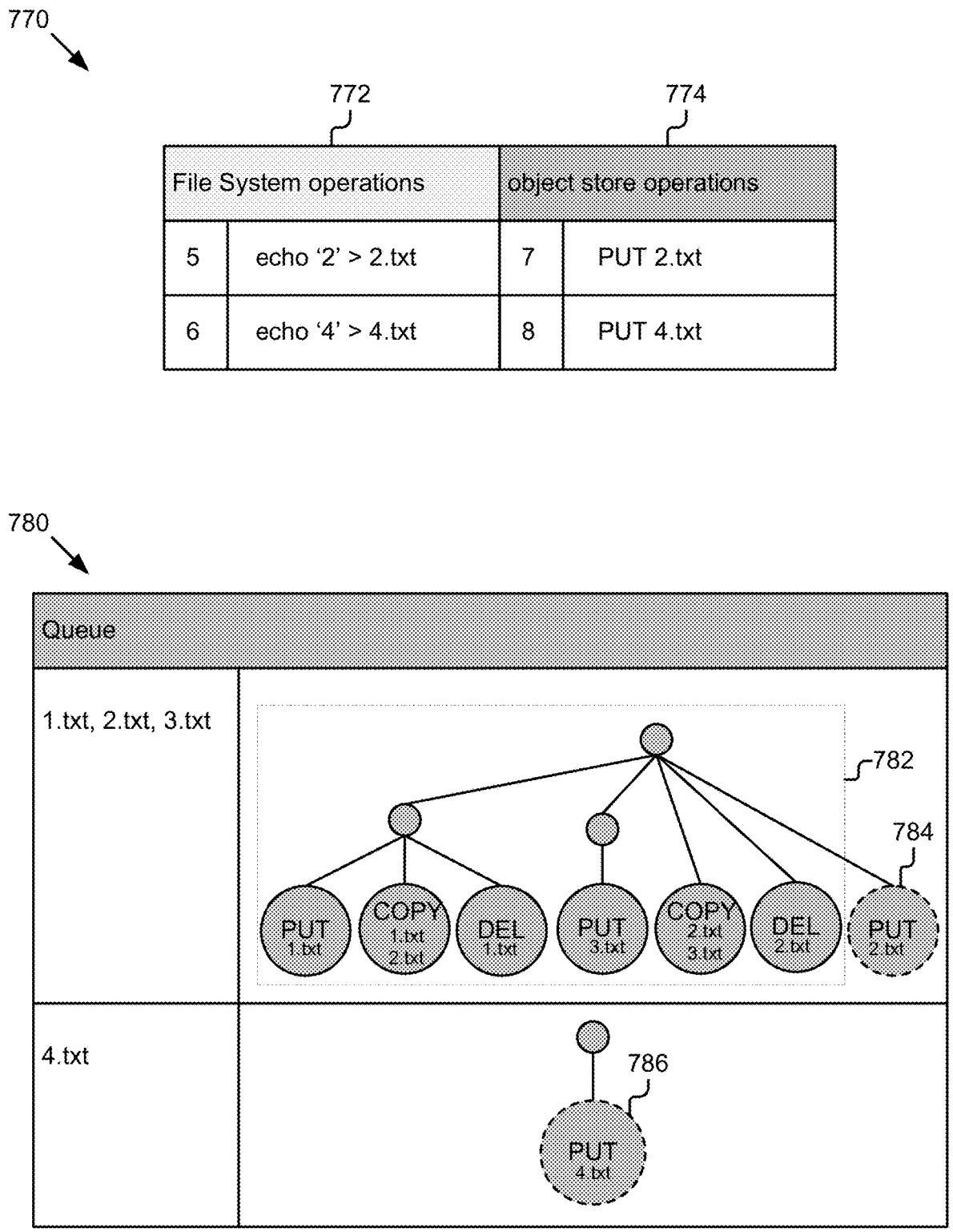

At block 410, if the IDs for an object store operation are not detected in two or more existent entries, the IDs should then be detected only in a single existent entry since the IDs of the identified objects have already been detected in existent entries. The method 308 may then assign the object store operation to the detected single entry. The object store operation may be added to the right end of the existent entry to ensure that the object store operation may not be executed ahead of these dependent object store operations in the existent entry. Table 730 in the FIG. 7B provides an example illustrating this situation. For a "Copy 1.txt 2.txt" operation 732, the object "1" is detected in a single existent entry containing a "PUT 1.txt" operation, while the object "2" is not detected in any existent entry. So, the operation 732 is added to the right end of the existent entry as shown in the figure. In the same table, a "Delete 1.txt" operation 734 for the same file system operation "mv.1.txt 2.txt." is added to the right of the operation 732 due to a logic sequential order for these two operations, as previously discussed. Table 780 in FIG. 7D provides another example to illustrate a similar situation. For a "PUT 2.txt" operation 784, the object "2" is detected in an existent dependency tree 782. Therefore, the operation 784 is added to the right end of the tree 782. In the same table, a "PUT 4.txt" operation is added as an independent operation to a new entry, as the object "4" is not detected in any existent entry.

For some of the corresponding object store operations, related IDs may be detected in even in two or more existent entries. The dependency of two or more existent entries introduced by an incoming single object store operation will bring an additional level of dependency, and thus the two or more existent entries containing the detected IDs may be merged into a new dependency tree at block 412. Table 760 in FIG. 7C provides an example illustrating this situation. For a "Copy 2.txt. 3.txt" operation 766, the objects "2" and "3" are detected in two or more existent entries (reflected by the two boxes 762 and 764), which may thus be merged into a new dependency tree. The two existent entries 762 and 764 may be organized as sub-trees of the new dependency tree, with each sub-tree may be considered as a branch of the new dependency tree. The sub-trees 762 and 764 may be merged without a preferred horizontal order as the two sub-trees may be executed in parallel. For instance, the sub-tree 764 may be placed in the left of the sub-tree 762 without affecting executing actual object store operations in these sub-trees.

At block 414, the method 308 may add the corresponding object store operation to the right end of the merged dependency tree. As shown in Table 760 of FIG. 7C, the object store operation 766 is added to the right end of the merged dependency tree. In the same Table 760, another object store operation 768 "Delete 2.txt" corresponding to the file system operation "mv 2.txt 3.txt" is added to the right of the operation 766 due to a logic sequential order for the two operations 766 and 768.

After a corresponding object store operation is assigned into an entry of the first queue, the object store operation may be removed from the list of the unassigned object store operations. The ordered list may then be updated by moving up the previously second-ranked operation to the first position of the list as a new first-ranked object store operation, which is then assigned similarly as discussed in the above.

At block 416, the method 308 may then determine whether there still have unassigned object store operations in the list. If there are unassigned object store operations in the list, the method 308 may then repeat the assignment process as shown at blocks 402-414. If not, the assignment of the corresponding object store operations based on the order and dependency is considered as completed. Table 780 in FIG. 7D shows an example of a complete order and dependency-based queue containing all object store operations corresponding to the above list of file system operations. Two entries exist in the queue with one containing an independent object store operation while the other containing a dependent tree.

Returning back to FIG. 3, the method 300 at block 310 may then determine priority of the corresponding object store operations base on types of operations and transfer an entry containing an object store operation with the priority from the first queue to a second queue. The method 300 may first determine types of object store operations. Although there may be different interfaces used in the file interface module 101, types of object store operations can still be determined based on the interfaces and names (or calls) of the object store operations. For instance, the object operation manager 103 may use "PUT" "Delete" "GET" "Post" "Copy" to represent base write, delete, read, update, copy operations. The method 300 may then determine priority of the object store operations based on "urgency" of different types of operations. The "urgency" may be reflected by whether and how soon a user needs an outcome from an object store operation. A "GET" operation may be considered as an urgent operation as a client may be waiting for an outcome of the operation. A "PUT" operation may be considered as a less urgent operation, as a client may not wait for outcome of the operation. After determining types of object store operations, the operations with "urgency" may be considered to have a priority. After determining the priority for each object store operation, the method 300 may then assign some the object store operations to a second queue based on the priority, as discussed in mode details with reference to FIGS. 5 and 8.

Figure 5:
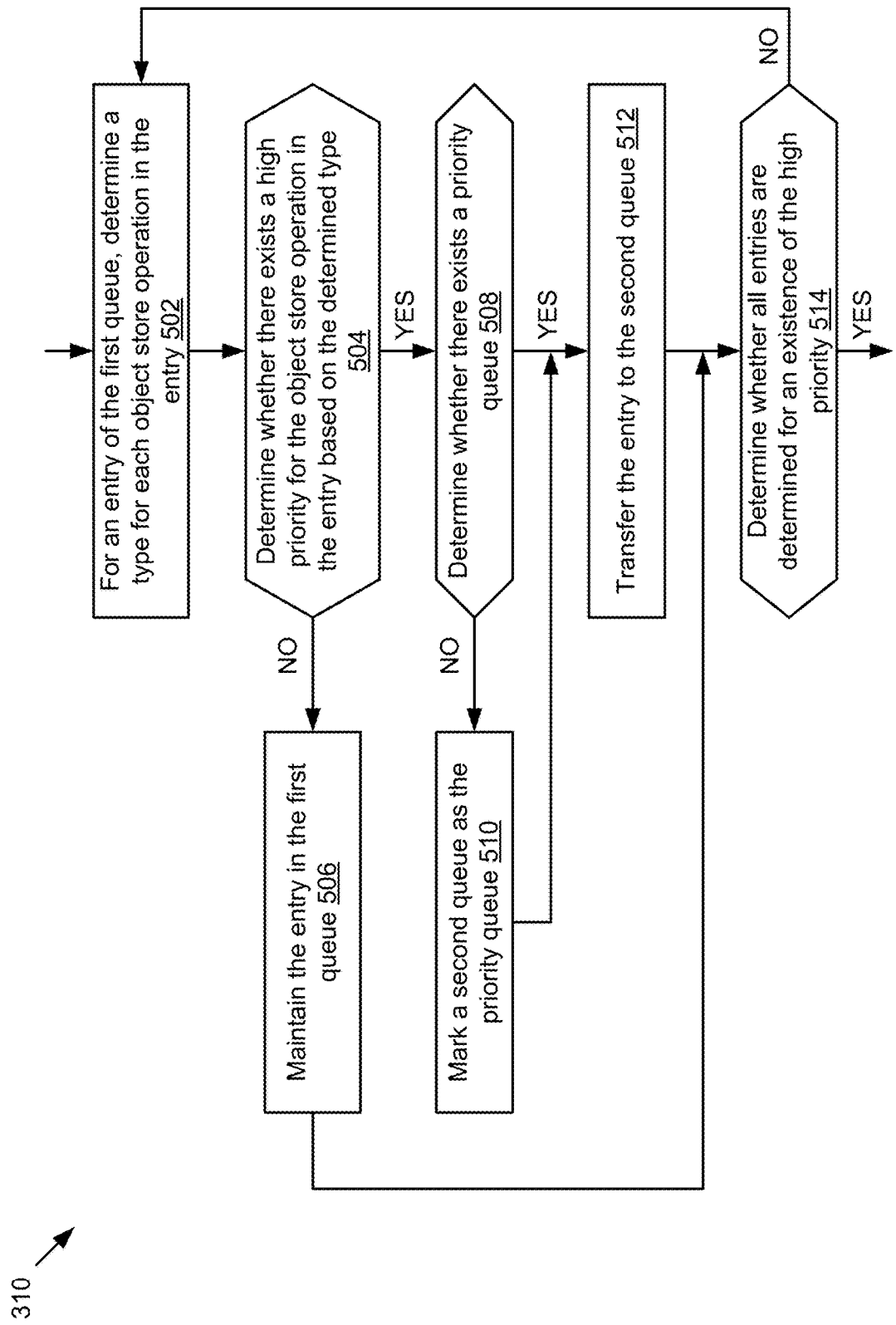
FIG. 5 is a flow chart of an example method for assigning object store operations based on priority.

Referring now to FIG. 5 for the priority-based assignment, the method 310 may start at block 502 by determining types of the corresponding object store operations in each entry of the first queue. The method 310 may determine types of operations based on name of each operation. For instance, the method may determine an operation is a "PUT" operation based on an operation name "PUT 1.txt," or a "GET" operation based on an operation name "GET 5.txt."

At block 504, the method 310 may then examine each entry of the first queue to determine whether there is an object store operation with a priority in the entry. In the illustrated embodiment, a "GET" operation may be considered to have a high priority, while all other operations may have a low priority. The method 310 may, therefore, check whether there is a "GET" operation in the entry. If there is, the method 310 may determine that the entry has a high priority (may also be referred to as a priority entry). If the entry containing multiple object store operations, each object store operation in the entry may be examined to determine whether it is a "GET" operation. If there is any, either one or two or more, the method 310 may determine the whole entry has a priority and is a priority entry.

At block 506, if no object store operation in the entry has a priority, the method 310 may remain the entry in the first queue.

However, if there is a priority entry in the first queue, the method 310 may determine whether exists a priority queue at block 508. If not, the method 310 may at block 510 mark a second queue as the priority queue, or simply create a priority queue, depending on configuration of the object operation manager 103.

At block 512, the method 310 may transfer the priority entries from the first queue to the priority queue. These priority entries may be added to the priority queue without a preference in vertical order since these entries are to be executed in parallel.

At block 514, the method 310 may check whether there are additional entries in the first queue (may also be referred to as the background queue, especially after the priority entries being transferred to the priority queue) that have not been examined for the priority. If there is, the method may repeat the procedure according to blocks 502-512 for these additional entries. If all entries in the first queue are examined, the whole assignment process is now considered as complete.

Figure 8:
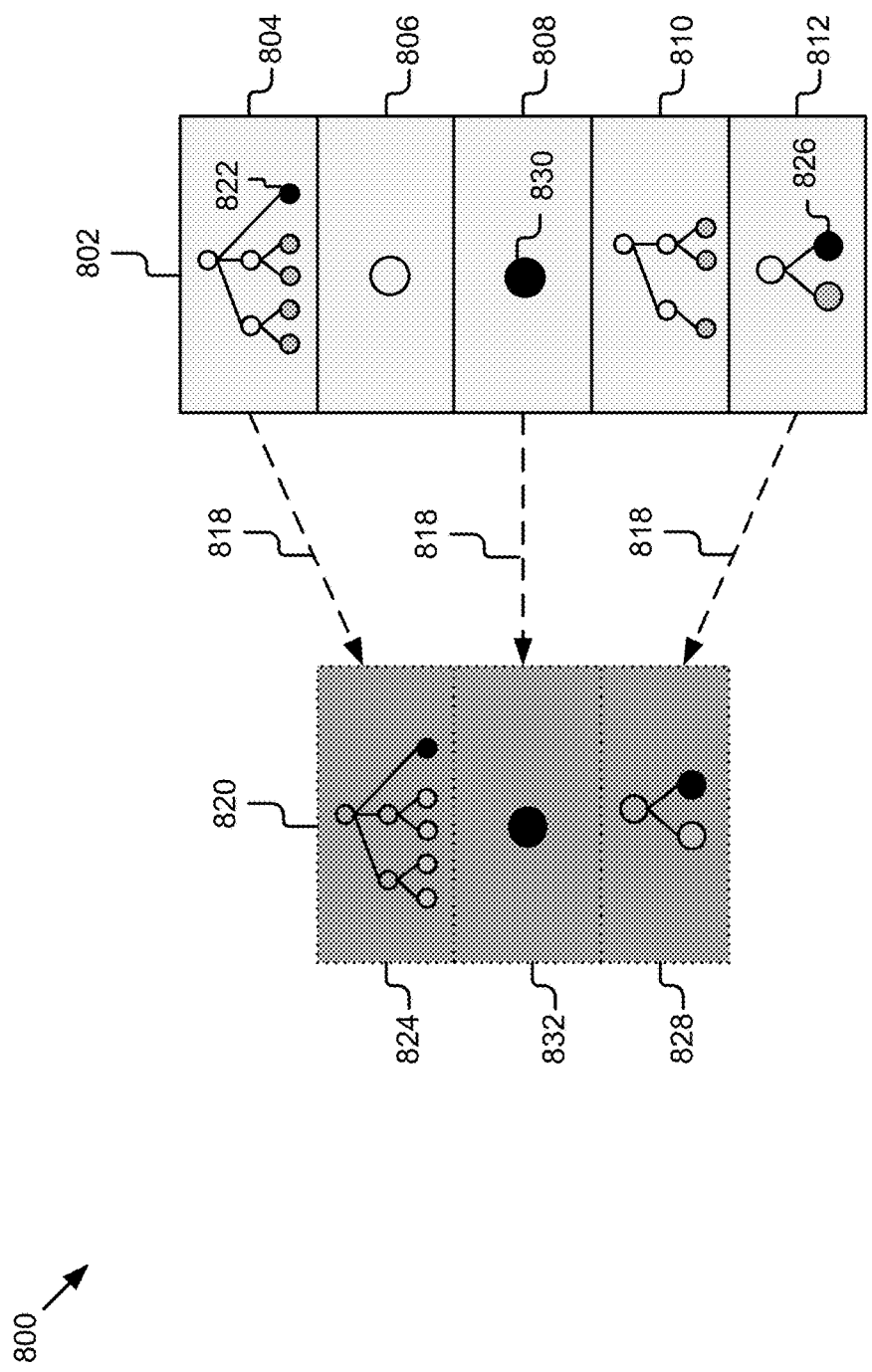
FIG. 8 is a graphical representation of assigning object store operations based on priority.

FIG. 8 provides a graphical representation to further illustrate priority-based object store operation assignment. As illustrated in the figure, there are two queues 802 and 820, in which the queue 802 is the background queue, while the 820 is the priority queue. The background queue 802 has five entries 804, 806, 808, 810, and 812. The entry 804 has an object store operation 822 with the priority (marked as a dark dot, similar for other operations with the priority in FIG. 8). The entry 806 only has one object store operation, which does not have a priority. The entry 808 also has only one object store operation 830, which does have a priority. The entry 810, which is a dependency tree with multiple object store operations, does not contain an operation the priority. The entry 812 is also a dependency tree with two object store operations, in which the operation 826 has a priority. The entries 804, 808, and 812 in the background queue 802 may, therefore, be considered as the priority entries. The three entries 804, 808, and 812 may be transferred 818 to the priority queue 820, and added as entries 824, 832, and 828 respectively. The three entries 824, 832, and 828 may not necessarily organized in a vertical order as shown in the figure, but can be in any other order since the three entries 824, 832, and 828 are to be executed in parallel. After transferring process, the background queue 802 and the priority queue 820 may then be ready for execution.

It should be noted that the assignment of object store operations may not always be performed according to the procedures in FIGS. 4 and 5, in which object store operations are first assigned to the background queue based on the order and dependency, and then some priority entries of the first queue may be transferred to the priority queue. In some embodiments, an object store operation may be considered based on three factors (i.e., order, dependency, and priority) for assignment before next object store operation will be considered for assignment. This is especially true when some object store operations show up after the priority queue and the background queue have already been established. At this moment, a first-ranked object store operation may be directly added to the priority queue if the object store operation itself has a priority or the operation has a dependency on an object store operation within the priority entry. For instance, for a first-ranked object store operation discussed in FIG. 4, if it has a priority, it may be not necessarily assigned first to the first queue as shown at block 406, 410, or 414, but is rather directly assigned to the priority queue. Similarly, for a dependency tree merged from two or more existent entries at block 412, it may not be necessarily added to the first queue, but rather directly added to the priority queue if any of the two or more existent entries has already been in the priority queue before the merging process.

Returning back to FIG. 3, after assigning the corresponding object store operations to the background and priority queues, these operations are now ready for execution. At block 312, the method 300 may then execute the object store operations in parallel and asynchronously based on organization of the object store operations in the background and priority queues. More details regarding parallel and asynchronous execution are provided in the following with reference to FIGS. 6 and 9.

Figure 6:
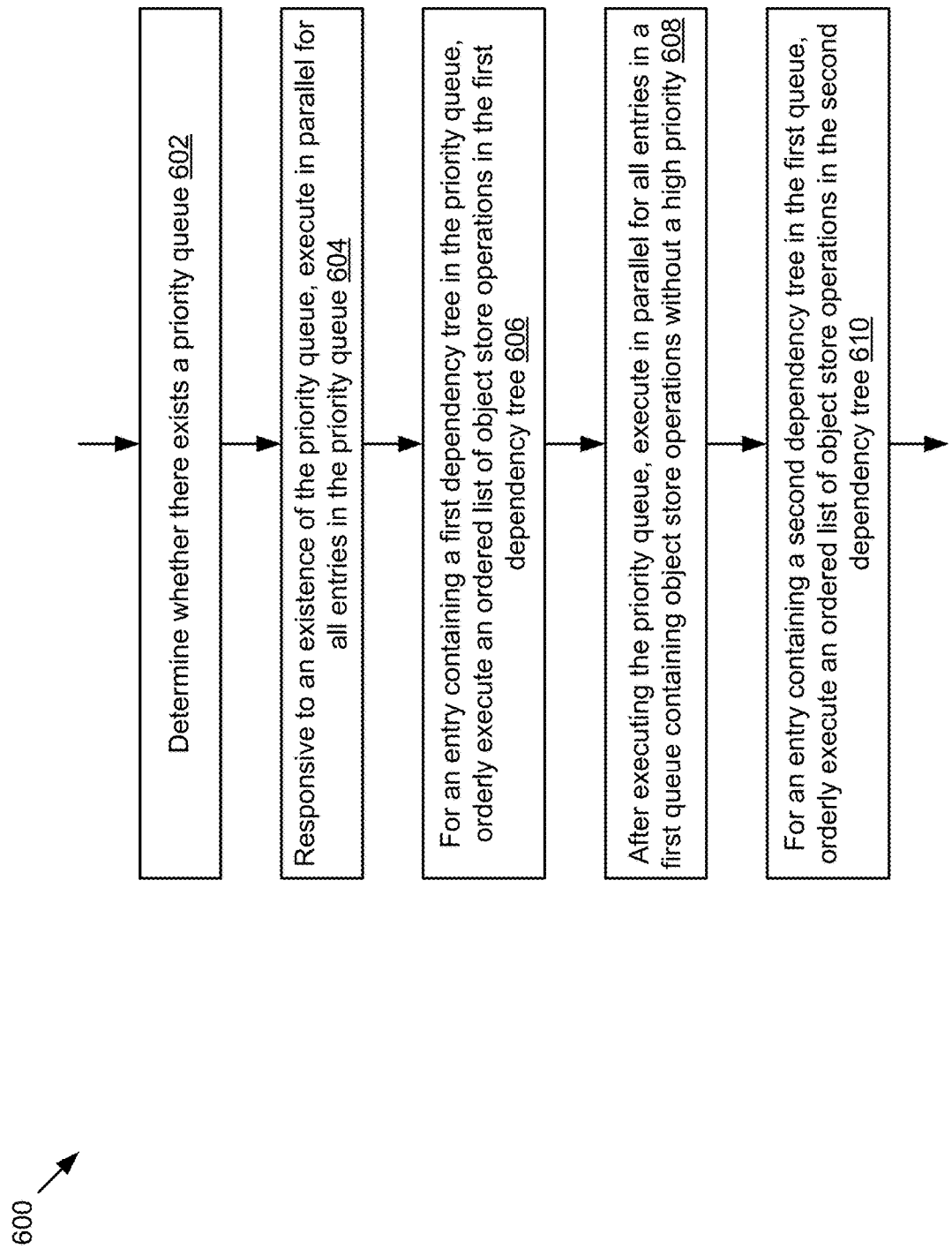
FIG. 6 is a flow chart of an example method for parallel and asynchronous execution of object store operations.
Figure 9:
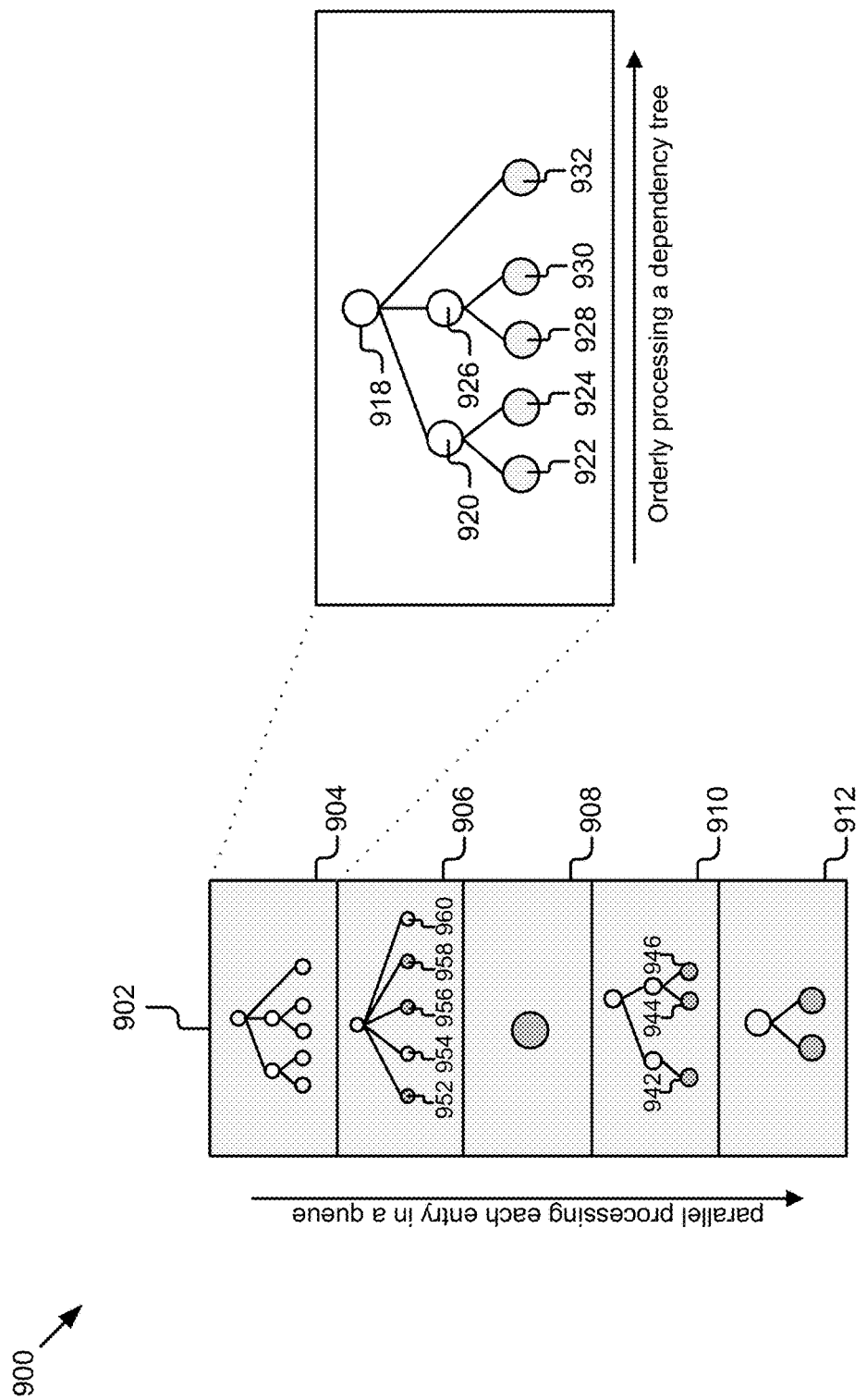
FIG. 9 is a graphical representation of parallel and asynchronous execution of object store operations.

FIG. 6 depicts an example method 600 to execute object store operations in the priority and background queues. To execute in parallel, the method 600 may execute all entries simultaneously, as many entries as resources allowed. An example for parallel execution is illustrated in FIG. 9. As shown in the figure, there are five entries 904, 906, 908, 910, and 912 in a queue 902. If the resource allows executing five or more entries simultaneously, the method 600 may start to execute the five entries 904, 906, 908, 910, and 912 simultaneously.

In some embodiments, the resource may be limited which may limit the number of entries to be executed simultaneously for a queue. For instance, there may be limited I/O paths, or file handles in the system 100. In this situation, the method 600 may process the limited number of entries in the queue first, and execute the remaining entries immediately after the resource is available again. The method 600 may have different ways to select which entries to be executed first. For instance, the method 600 may randomly select the limited number of the entries from the queue, select the limited number of entries based on the earliest object store operation in each entry, or based on the shortest time to finish execution of an entry, or based on any other preference set up in the object operation manager 103.

To execute asynchronously, the method 600 may execute object store operations in a sequential order for an entry containing dependent object store operations (i.e., an entry with a dependency tree). The method 600 may execute the dependent object store operations according to the dependency tree structure in the entry. An example of asynchronous execution is illustrated in FIG. 9. As shown in the enlarged part, the entry 904 has a dependency tree with five object store operations 922, 924, 928, 930, and 932. The circles 918, 920, and 926 may represent the tree or two sub-trees respectively. For instance, the circle 918 represents the dependency tree containing two sub-trees 920, 926, and the operation 932. The sub-tree 920 has two object store operations 922 and 924, while the sub-tree 926 has two object store operations 928 and 930. To execute these object store operations asynchronously, the method 600 may execute the operations in a general left-to-right order but with an exception for the sub-trees. The two sub-trees 920 and 926 may be executed in parallel, or simultaneously. However, for a specific sub-tree, the object store operations inside the sub-tree are still to be executed in a left-to-right order. For instance, for the sub-tree 920, the operation 924 may be executed after the operation 922. Similarly, the operation 930 may be executed after the operation 928 for the sub-tree 926. For the whole dependency tree 918, only after in parallel execution of the two sub-trees 920 and 926, the object store operation 930 may then be executed, according to the generally left-to-right rule. The exact order for executing the entry 904 may be described as (922→924| 928→930)→932, where "→" indicates a left-to-right order execution, "|" indicates a in parallel execution, while "( )" indicates an execution of all operations inside the "( )" before executing the ones after "( )". The method 600 may execute other entries containing sub-trees similarly for the queue 902. For instance, the method 600 may execute the entry 910 in an order of (942|944→946). However, for an entry containing a dependency tree without sub-trees, the method 600 may execute the object store operations in the entry in an exact left-to-right order. For instance, for the entry 906 with no sub-tree, the method 600 may execute the object store operations in an order of 952→954→956→958→960.

Back to FIG. 6, to execute the object store operations for the corresponding file system operations, the method 600 may first determine whether there exists a priority queue at block 602. If there is a priority queue, the method may execute the priority queue first, as shown at blocks 604 and 606.

To execute the priority queue, the method may execute each entry in the priority queue in parallel at block 604. For an entry containing multiple dependent object store operations, the method 600 may execute the multiple object store operations asynchronously at block 606. The parallel and asynchronous execution of the priority queue may be performed similarly as discussed above for the queue 902. It should be noted that the two blocks 604 and 606 are separated for interpretation purpose only. The two steps are generally processed at the same time in actual execution, since an asynchronous execution of one entry is actually a part of parallel execution of all entries in the queue. It should also be noted that an object store operation having a high priority in a dependency tree does not necessarily move that object store operation to an earlier execution in the asynchronous execution. Sequential execution of all dependent object store operations in the entry may still follow the tree structure and may not be changed by the appearance of a high-priority operation.

After executing the priority queue, the method 600 may then execute the background queue at blocks 606 and 608. The execution of the background queue may be performed similarly as executing the priority queue, or as discussed previously for the queue 902. In some embodiments, there might be no entry in the background queue as all entries may be priority entries. In this condition, the method 600 may stop at block 606 after executing the priority queue.

It should be noted that different entries may take different time to execute, either for the background queue or the priority queue. For the priority queue, for any entry, after its execution, it may be removed from the queue. In some embodiments, some new priority entries may be dynamically assigned to the priority queue during the execution. These new priority entries may be executed immediately after they are added to the priority queue and if the resource is allowed. Only after emptying all entries in the priority queue, including the newly added entries, the method 600 may then process the background queue. In some embodiments, even if the method 600 has already proceeded to execute the background queue, the method 600, without affecting inaccuracy and inconsistency of the objects in execution, may still need to switch back to the priority queue for execution. For the background queue, similarly, each entry may take different time to execute. Once executed, the entry may be removed from the queue, and new entries may be dynamically added to the queue, so that object store operations may be consistently processed to keep up with feeding file system operations.

Systems and methods for translating file system operations into object store operations have been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some embodiments above with reference to interfaces and particular hardware. Moreover, the technologies disclosed above primarily in the context of network-based object storage; however, the disclosed technologies apply to other object storage management.

Reference in the specification to "one embodiment", "some embodiments" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent order of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware embodiment, an entirely software embodiment or an embodiment containing both software and hardware elements. In some embodiments, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to embodiment in any specific programming language, or for any specific operating system or environment. Accordingly, the disclosure of the present techniques and technologies is intended to be illustrative, but not limiting.

What is claimed is:

1. A system comprising:
   an object storage system configured to store data as objects; and
   an atomic execution unit configured to execute operations comprising:
      receiving a plurality of file system operations for operating on files in a file system;
      determining objects corresponding to the files in the object storage system and a plurality of object storage operations corresponding to the plurality of file system operations;
      determining dependency among the plurality of object storage operations based on the objects affected by the plurality of object storage operations, and assigning the plurality of object storage operations to a first queue;
      merging, based on the dependency, at least two dependent object storage operations into a dependency tree in the first queue;
      determining priority of object storage operations in the plurality of object storage operations in the first queue based on types of the object storage operations, and transferring an entry associated with an object storage operation having a determined priority from the first queue to a second queue, the second queue having object storage operations independent of each other; and
      executing, in parallel, entries associated with object storage operations having the determined priority and being independent of each other in the second queue, and asynchronously executing at least two dependent object storage operations in a dependency tree of at least one of the entries in the second queue;
   wherein:
      the atomic execution unit comprises:
         a file interface module configured to receive the plurality of file system operations and decouple them from the plurality of object storage operations; and
         an object operation manager configured to organize the plurality of object storage operations for atomic and efficient operation;
      the file interface module is coupled for communication with the object operation manager and a network; and
      the object operation manager is coupled for communication with the object storage system.

2. The system of claim 1, wherein the atomic execution unit is further configured to transfer the entry associated with the object storage operation having the determined priority from the first queue to the second queue without a preference in vertical order.

3. The system of claim 2, wherein the object operation manager includes an operations queue for storing sequences of the plurality of object storage operations.

4. The system of claim 3, wherein an object storage operation involving a particular object identifier is stored as part of a same entry in the operations queue and part of a same dependency tree.

5. The system of claim 2, wherein the object operation manager includes a hash table to correlate each entry of an operations queue with a respective object identifier.

6. The system of claim 2, wherein the object operation manager includes a dependency action manager for determining the dependency based on the objects affected by multiple object storage operations.

7. The system of claim 2, wherein the object operation manager includes the second queue as a high priority queue and the first queue as a low priority queue to allow parallel processing of entries first from the high priority queue followed by parallel processing of entries from the low priority queue, and to allow asynchronous processing of a dependency tree in the high priority queue and the low priority queue.

8. A computer-implemented method comprising:
receiving a plurality of file system operations for operating on files in a file system;
determining objects corresponding to the files in an object storage system and a plurality of object storage operations corresponding to the plurality of the file system operations;
determining dependency among the plurality of object storage operations based on the objects affected by the plurality of object storage operations;
assigning the plurality of object storage operations to a first queue by:
  determining an order of the plurality of object storage operations based on a timestamp associated with receiving the plurality of the file system operations in the file system;
  determining unassigned object storage operations in the plurality of object storage operations; and
  ranking the unassigned object storage operations in a list according to the order of the plurality of object storage operations;
merging, based on the dependency, at least two dependent object storage operations into a dependency tree in the first queue;
determining priority of object storage operations in the plurality of object storage operations in the first queue based on types of the object storage operations;
transferring an entry associated with an object storage operation having a determined priority from the first queue to a second queue, the second queue having object storage operations independent of each other;
executing, in parallel, entries associated with object storage operations having the determined priority and being independent of each other in the second queue; and
asynchronously executing at least two dependent object storage operations in a dependency tree of at least one of the entries in the second queue.

9. The computer-implemented method of claim 8, wherein determining the dependency among the plurality of object storage operations based on the objects affected by the plurality of object storage operations comprises:
determining an object affected by a first object storage operation;
determining whether the object is affected by a second object storage operation; and
in response to determining that the object is affected by the second object storage operation, determining a dependency between the first and the second object storage operations.

10. The computer-implemented method of claim 8, wherein transferring the entry associated with the object storage operation having the determined priority from the first queue to the second queue is executed without a preference in vertical order.

11. The computer-implemented method of claim 10, wherein assigning the plurality of object storage operations to the first queue further comprises:
selecting a first-ranked object storage operation in the list;
identifying an object affected by the first-ranked object storage operation;
determining whether the identified object already has an existing object storage operation;
in response to determining that the identified object already has the existing object storage operation, determining whether the identified object is detected in two or more existent entries;
in response to determining that the identified object is detected in the two or more existent entries, merging the two or more existent entries into a merged dependency tree and adding the merged dependency tree as an entry to the first queue;
adding the first-ranked object storage operation to the merged dependency tree; and
updating the list of the unassigned object storage operations by removing the first-ranked object storage operation from the list.

12. The computer-implemented method of claim 8, wherein executing entries associated with object storage operations having the determined priority in the second queue in parallel comprises:
determining whether there is a plurality of entries in the second queue; and
in response to determining that there is an entry in the second queue, executing entries in the second queue in parallel.

13. The computer-implemented method of claim 12, wherein asynchronously executing at least two dependent object storage operations in the dependency tree of at least one of the entries in the second queue comprises sequentially executing the at least two dependent object storage operations in a general left-to-right order in the dependency tree.

14. The computer-implemented method of claim 8, wherein determining the priority of the object storage operations in the plurality of object storage operations in the first queue based on types of the object storage operations, and transferring the entry associated with the object storage operation having the determined priority from the first queue to the second queue comprises:
determining an operation type for the object storage operation;
determining whether the operation type has a high priority;
in response to determining that the operation type has the high priority, assigning the priority to the object storage operation;
determining whether an entry in the first queue includes the object storage operation with the priority; and
in response to determining that the entry in the first queue includes the object storage operation with the priority, transferring the entry into the second queue.

15. A system comprising:
an object storage system configured to store data as objects;
an atomic execution unit comprising:
  a file interface module configured to receive a plurality of file system operations, the file interface module coupled for communication with a network and an object operation manager; and
  the object operation manager configured to organize a plurality of object storage operations for atomic and efficient operation, the object operation manager coupled for communication with the object storage system;

means for receiving the plurality of file system operations for operating on files in a file system;

means for determining objects corresponding to the files in the object storage system and the plurality of object storage operations corresponding to the plurality of the file system operations;

means for determining dependency among the plurality of object storage operations based on the objects affected by the plurality of object storage operations;

means for assigning the plurality of object storage operations to a first queue by:
  determining an order of the plurality of object storage operations based on a timestamp associated with receiving the plurality of the file system operations in the file system;
  determining unassigned object storage operations in the plurality of object storage operations; and
  ranking the unassigned object storage operations in a list according to the order of the plurality of object storage operations;

means for merging, based on the dependency, at least two dependent object storage operations into a dependency tree in the first queue;

means for determining priority of object storage operations in the plurality of object storage operations in the first queue based on types of the object storage operations;

means for transferring an entry associated with an object storage operation having a determined priority from the first queue to a second queue, the second queue having object storage operations independent of each other;

means for executing, in parallel, entries associated with object storage operations having the determined priority and being independent of each other in the second queue; and means for asynchronously executing at least two dependent object storage operations in a dependency tree of at least one of the entries in the second queue.

16. The system of claim 15, wherein the means for determining dependency among the plurality of object storage operations based on the objects affected by the plurality of object storage operations comprises:
  means for determining an object affected by a first object storage operation;
  means for determining whether the object is affected by a second object storage operation; and
  means for determining a dependency between the first and the second object storage operations, in response to determining that the object is affected by the second object storage operation.

17. The system of claim 15, wherein the means for transferring the entry associated with the object storage operation having the determined priority from the first queue to the second queue is executed without a preference in vertical order.

18. The system of claim 17, wherein the means for assigning the plurality of object storage operations to the first queue comprises:
  means for selecting a first-ranked object storage operation in the list;
  means for identifying an object affected by the first-ranked object storage operation;
  means for determining whether the identified object already has an existing object storage operation;
  means for determining whether the identified object is detected in two or more existent entries, in response to determining that the identified object already has the existing object storage operation;
  means for merging the two or more existent entries into a merged dependency tree and adding the merged dependency tree as an entry to the first queue, in response to determining that the identified object is detected in the two or more existent entries;
  means for adding the first-ranked object storage operation to the merged dependency tree; and
  means for updating the list of the unassigned object storage operations by removing the first-ranked object storage operation from the list.

19. The system of claim 15, wherein the means for executing entries associated with object storage operations having the determined priority in the second queue in parallel comprises:
  means for determining whether there is a plurality of entries in the second queue; and
  means for executing entries in the second queue in parallel, in response to determining that there is an entry in the second queue.

20. The system of claim 19, wherein the means for asynchronously executing at least two dependent object storage operations in the dependency tree of at least one of the entries in the second queue comprises:
  means for sequentially executing the at least two dependent object storage operations in a general left-to-right order in the dependency tree.

* * * * *